United States Patent

[11] 3,586,255

| [72] | Inventor | Pierre Monthulet |
| | | Cluses, France |
| [21] | Appl. No. | 769,204 |
| [22] | Filed | Oct. 21, 1968 |
| [45] | Patented | June 22, 1971 |
| [73] | Assignee | Establissements Carpano & Pons |
| | | Cluses, France |
| [32] | Priority | Oct. 27, 1967 |
| [33] | | France |
| [31] | | 126,082 |

[54] SPINNING REEL WITH WINDING DRUM BRAKE
7 Claims, 4 Drawing Figs.

[52] U.S. Cl. .................................................. 242/84.21
[51] Int. Cl. .................................................. A01k 89/00
[50] Field of Search .................................. 242/84.21, 84.2

[56] References Cited
UNITED STATES PATENTS
| 2,498,987 | 2/1950 | Duncan | 242/84.21 |
| 2,587,462 | 2/1952 | Goldberg | 242/84.2 (D) |
| 2,713,463 | 7/1955 | Sarah | 242/84.21 |
| 2,863,617 | 12/1958 | Chapin et al. | 242/84.21 |
| 3,045,942 | 7/1962 | Henze | 242/84.21 |

FOREIGN PATENTS
| 905,268 | 4/1945 | France | 242/84.2 |
| 511,716 | 1/1955 | Italy | 242/84.21 |

Primary Examiner—Billy S. Taylor
Attorneys—Robert E. Burns and Emmanuel J. Lobato ABSTRACT: A compact spinning reel having a spool and winding drum is disclosed wherein a brake mechanism for preventing undersired rotation of the winding drum during a casting operation is disposed within a housing provided in the winding drum. The brake mechanism comprises a toothed braking member cooperative with a pivotally mounted lever to effectively lock the winding drum against rotation during a casting operation by the user. A line pickup is mounted on the winding drum for movement to a line retrieval position and a line casting position and functions to actuate the brake mechanism when in the latter position.

SPINNING REEL WITH WINDING DRUM BRAKE

There already exist reels with surrounded spools which have anti-inertia brakes intended to avoid all unwanted closing of the pickup during the casting through rotation of the drum, however no reel with surrounding spool is equipped with such a device because of the difficulties existing in housing a braking device in a reduced apace.

The invention has for its object to obviate to the abovementioned disadvantages.

To this effect, the invention is concerned with a casting reel with surrounding spool comprising an anti-inertia brake acting on the drum when the pickup is brought to withdrawn position and blocking this pickup in this position, characterized in that the said brake comprises a toothed ring frictionally mounted around a pivoting axis, under the drum, with a lever pivoted on this drum, engaged by an arm inside it and able to mesh through the extremity of this arm with the teeth of the ring, under the urging of a spring, with a ramp on the ring to free the lever from the teeth when the drum occupies a given angular position, a cam integral with an end of the pickup acting on the second arm of the lever when this pickup returns from its withdrawn position into its active position, this same extremity of the pickup having a nick intended to receive therein the second arm of the lever when the pickup is brought into withdrawn position, the angular path of the lever being limited by meeting with the ramp of the toothed disc to free this lever from the nick and free the pickup.

The toothed disc of the brake is mounted coaxially to the drum on a cylindrical shoulder of the casing for mechanically driving this drum.

In a particularly advantageous embodiment of the invention, the cam is integral with the barrel and the return spring of the pickup and the nick is cut in the wall of this barrel. The barrel is preferably cylindrical, it is pivoted on a eccentric shaft and it is its outer surface which constitutes the said cam.

Other characteristics and features of the present invention will appear upon reading the following description which refers to the accompanying drawing, which represents by way of nonlimiting example one embodiment of the reel with surrounding spool according to the invention:

Figure 1:
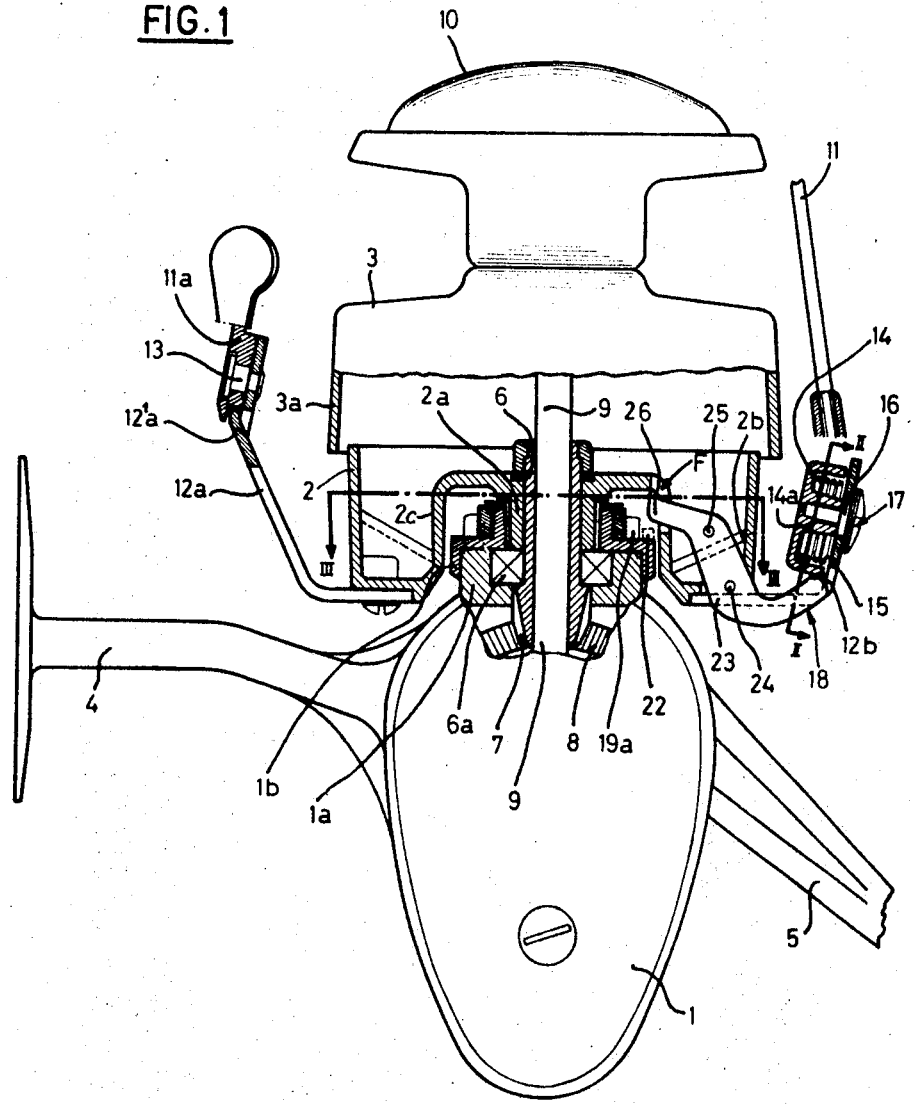
FIG. 1 is an elevational view with partial vertical cross section.

The reel according to the invention comprises a casing 1 containing a mechanism for rotating a drum 2 and giving alternate vertical movement to a spool 3 surrounding drum 2 by means of a depending rib or apron 3a during its axial movement. The reel is secured to the rod by foot 4 and its control is manually effected by acting on a rotating handle 5 partially shown.

Drum 2 has a cup-shaped recessed portion 2c with a central hollow core 2a in the opening of which is secured a hollow shaft or sleeve 6 the lower end of which forms a pinion 7 meshing with the last gear 8 of the driving system of the reel. The recessed portion 2c of the drum 2 forms a housing for brake mechanism for the drum as described more fully below.

Figure 3:
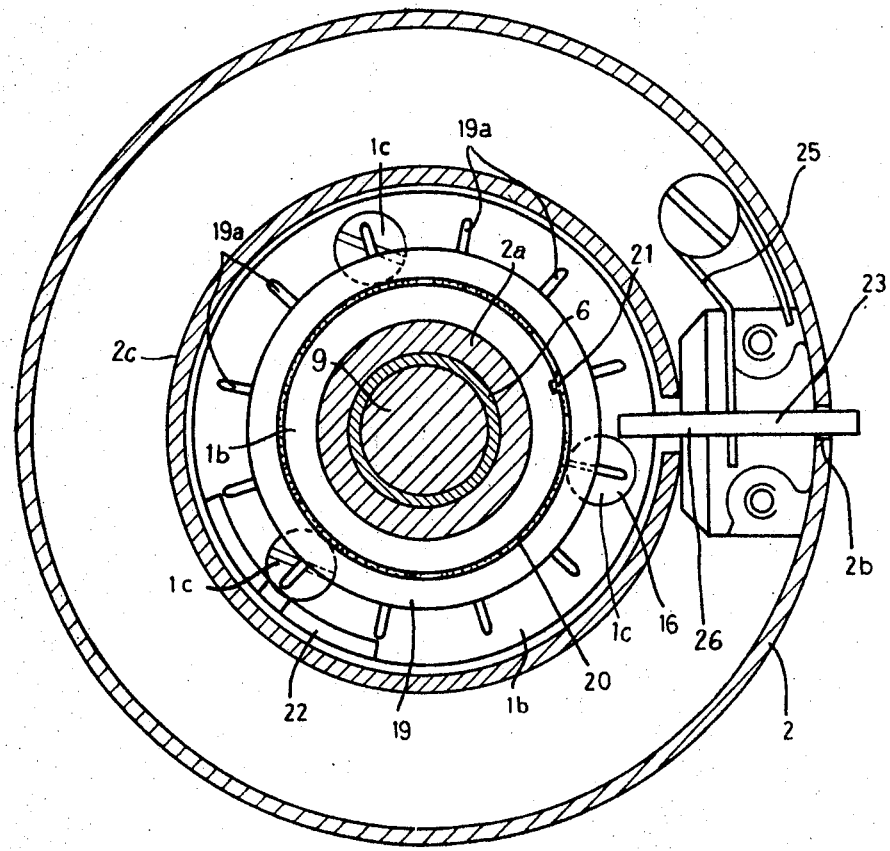
FIG. 3 is an enlarged partial cross section taken along line III–III of FIG. 1.

Sleeve 6 is locked axially by means of a ring 6a forming a bearing, finding support against pinion 7 and placed in a housing 1a of the upper part of casing 1 in which it is maintained by a cap 1b held by screws 1c within the brake-retaining housing (FIG. 3). Naturally, ring 6a could in a modification be replaced by a ball bearing.

Drum 2 is rotatably mounted through its sleeve 6 relative to shaft 9 which passes through it and which is secured at its upper part to spool 3, the previously mentioned alternate axial movement of which it ensures.

As is known from previous reels, the linking between the spool 3 and the shaft 9 is made through a brake, not shown, the extent of braking of which can be adjusted by acting angularly on button 10 which appears above the spool. When this brake is entirely let go, the spool can turn on its shaft 9 with a certain facility while it can even be completely locked angularly if the brake is completely tightened.

The reel according to the invention also comprises a pickup loop 11 mounted on two diametrically opposite arms 12a and 12b which are integral with the lower side of drum 2.

Figure 2A:
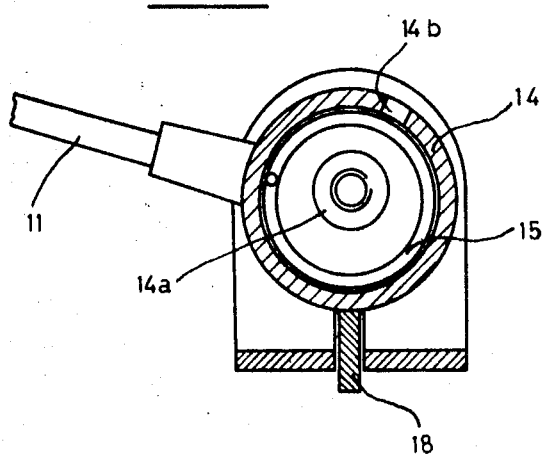
FIG. 2a is a cross section taken along line II–II of FIG. 1.
Figure 2B:
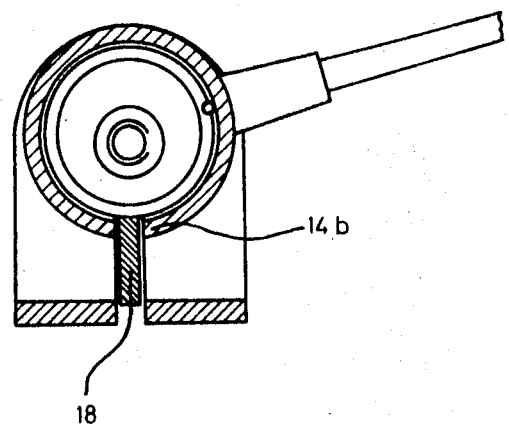
FIG. 2b is a similar view for another position of its elements.

At the right-hand extremity of the pickup 11 is positioned the return spring which tends to bring it back into retrieval position (FIG. 2a) when it has been moved away therefrom, in particular to be brought into a casing or withdrawn position (FIG. 2b).

In effect, the pickup is integral with a small casing 14 such that movement of the pickup effects a corresponding movement of the casing 14. The casing 14 forms the barrel for a coiled spring 15 one end of which is secured to the barrel and the other to leg 12b.

This barrel is cylindrical and turns freely on arm 12b through a shaft 16 constituted by the central part of a screw 17 meshing with a corresponding thread in the opening of a small tube 14a projecting inside barrel 14. The axis of tube 14a is offcenter relative to the axis of symmetry of the cylindrical outer surface of the barrel, this surface constituting a cam as we shall see later.

The lateral side of the barrel is cut at 14b (FIGS. 2a and 2b) in order to receive a pickup stop 18 maintaining this pickup in its withdrawn position when it has been brought thereto. The return spring of the pickup is thus entirely external to the reel drum, it is consequently possible for the user to proceed, if required, with the substitution of this spring without having to disassemble the entire reel and without using any particular tools, a single screwdriver, or a coin, being sufficient to move away screw 17 and free barrel 14 from arm 12b.

Additionally, this construction makes it possible to increase the angular path of the pickup and therefore to diminish the general dimensions while obtaining a very facile emergence of line, in particular during casting.

At its left-hand extremity pickup 11 is secured to arm 12a by a flat piece 11a pivoted on shaft 13 making an angle of about 80° with the spool. The end of arm 12a has a stop 12'a cooperating with a projection not shown in part 11a.

The fact of mounting a stop for the pickup at one of its extremities and the return spring 14 at the other causes a substantial reduction in the noise level which occurs when the pickup returns to its retrieving position under the urging of its return spring. This reduction is due to the fact that the pickup itself absorbs by deformation during impact a part of the energy released by spring 14.

The advantages which result from this new structure of the reel do not stop there: it is in fact possible to provide now an anti-inertia brake mechanism, a technical improvement heretofore unknown in the field of reels with surrounding spool. This device, well known in other types of reels, has for its purpose to avoid the unwanted release of the pickup during the casting operation.

In the reel of the invention, this brake comprises the following elements all disposed within the brake-retaining housing: around the upper collar of the previously mentioned cap 1b is provided a toothed ring 19 of plastic material comprising one of a pair of braking members, with the interposition of a friction spring 20, annular in shape, moored by one end at 21 on part 1b and which acts by rubbing on the greater part of its length on the inside of the opening in the ring.

On cap 1b also projects upwardly an incline 22 the peak of which is not as high as the upper level of teeth 19a on ring 19.

Drum 2 is additionally cut at 2b (FIGS. 1 and 2) in such a way as to form a passage for an arm of the cam-actuated lever 23 pivoted on the drum at 24 and the right-hand extremity in the drawing constitutes the stop 18 for the pickup previously mentioned. This lever is subjected to the action of a spring 25 (FIGS. 1 and 3) tending to make it tip in the F direction when stop 18 faces slot 14b, that is to say when the pickup has been brought into withdrawn position. For every other position of the pickup, lever 23 through its extremity 18 is in contact with the outer cylindrical surface of barrel 14. Since this barrel is eccentrically pivoted on arm 12a, any tripping of the pickup 11 will result in a tripping in the F direction or in the opposite direction according to the direction of movement of the pickup. In particular, when the pickup is brought from its retrieval position into its withdrawn position, lever 23 will move in the F direction in such a way that its left-hand extremity 26 which comprises a projection constituting the other braking member will gradually penetrate in the space comprised between two successive teeth 19a in ring 19. As soon as this extremity 26 of lever 23 will reach this position, the rotation of drum 2 around its shaft 9 will only be possible upon acting against the braking action of spring 20 against the side of the opening of toothed ring 19.

This braking will also be maintained when, the pickup being brought into withdrawn position, the extremity 18 of lever 23 will have penetrated in the slot or recess 14b of the barrel to releasably lock the pickup.

The braking spring 20 will naturally have characteristics such that it will prevent and restrict all rotation of drum 2 under the action of its inertia, for example, when the fisherman casts and this regardless of the angular position of the drum at that moment.

It should be noted that the return takes place automatically as soon as the drum is rotated by the action of the user on handle 5 and such rotation forces the projection 26 to rotationally drive the toothed ring 19 whereby sufficient angular movement of the drum will have brought the projection 26 of lever 23 to the level of incline 22 (FIG. 1) (FIG. 3) with which is provided cap 1b of casing 1.

In effect, upon meeting this incline, lever 23 will be raised in a direction opposite to F, against its return spring 25 in a manner sufficient to free its extremity 18 from slot 14b of the barrel in which this extremity was engaged. Under these conditions, pickup 11 is abandoned to the action of its return spring 15 which will bring it back into retrieval position.

The angular movement of the barrel, in particular of its outer side forming a cam, causes lever 23 to tip more in the direction contrary to F in a sufficient manner to free completely its extremity 26 from the teeth of ring 19. The various elements of the pickup then occupy the position seen in FIG. 1.

It should also be noted that the eccentricity of the barrel is selected so that the braking of the drum by spring 20 takes place as soon as the pickup has been tripped by hand from its retrieval position to its withdrawn position.

Although the above-mentioned anti-inertia brake has only been described and shown in combination with a barrel containing the return spring of the pickup, it is evident that the same constitution of the brake could also be adapted to a reel the return spring of which would be housed in a different fashion, for example inside the drum, in traditional fashion. In this case, the barrel could be replaced by a simple eccentric disc, forming a cam, cut on its edge by a slot permitting the introduction of an end of lever 23, intended to lock the pickup.

What I claim is:

1. Spinning reel comprising: a casing; a drum and a spool mounted on said casing, said spool having a flange dimensioned to surround said drum upon axial movement thereof; means for rotating said drum and axially reciprocating said spool; a line pickup movable to a line retrieving position and a line casting position; spring means for urging said pick up into said line retrieving position; an anti-inertia brake mechanism cooperative with said drum to lock said pickup in said line casting position said brake comprising a rotatable hollow shaft in said drum, a toothed ring mounted on said shaft coaxially with said drum, a lever pivotally mounted on said drum engageable with said toothed ring to effect locking of said pickup, biasing means for urging said lever toward said ring, said ring further having an inclined portion operative to disengage said lever from said toothed ring when said drum reaches a predetermined angular position, cam means for pivoting said lever when said line pickup is moved from said line casting position to said line retrieval position, one end of said pickup having therein means defining a recess for receiving an end of said lever when said line pickup is in said line casting position; whereby movement of said drum when said lever is in engagement with said toothed ring effects disengagement of said lever in response to same contacting said inclined portion and wherein such movement is sufficient to disengage said lever from said recess and accordingly free said line pickup.

2. Reel according to claim 1, wherein said means for rotating said drum is housed in a casing having a cylindrical flange and said toothed ring is mounted thereon.

3. Reel according to claim 2, including a spring means positioned between said cylindrical flange and said ring for frictionally bearing upon said ring.

4. A compact spinning reel assembly comprising: means defining a spinning reel casing; a winding drum rotatably mounted on said casing having means therein defining a brake-retaining housing; a spool mounted on said casing for reciprocal movement relative to said winding drum and having a depending rim configured to enclose said winding drum when said spool is reciprocated to one end position; means for effecting rotation of said drum and reciprocation of said spool; a movable line pickup on said drum for movement to a line retrieval position wherein same cooperates with said spool to effect retrieval of a line and to a line casting position; and brake means including a pair of releasably engageable braking members disposed within said brake-retaining housing operative in response to movement of said line casting position for restricting rotational movement of said winding drum relative to said casing; said brake means including spring friction means mounted on said casing for preventing rotation of one of said braking members until a force in excess of a predetermined value is applied thereto by the other of said braking members.

5. A compact spinning reel assembly according to claim 4; wherein said one braking member comprises a toothed ring in frictional braking contact with said spring friction means; and wherein said other braking member comprises a projection movable into and out of engagement with said toothed ring in response to alternate movement of said line pickup to said line casting and line retrieval positions, respectively.

6. A compact spinning reel assembly according to claim 5; wherein said braking means comprises a cam-actuated lever pivotally mounted on said winding drum and having at one end thereof said projection, biasing means for normally biasing said cam-actuated lever in a given direction to effect engagement between said toothed ring and projection, and cam means connected to said line pickup for camming said cam-actuated lever in a direction opposite to said given direction to maintain disengagement between said toothed ring and projection when said line pickup is in said line retrieval position and to permit engagement therebetween by said biasing means when said line pickup is in said line casting position.

7. A compact spinning reel assembly according to claim 6; wherein said cam means comprises an eccentrically mounted cam in camming contact with a portion of said cam-actuated lever and having means therein defining a slot dimension to receive said cam-actuated lever portion when said line pickup is in said line casting position.